US006481083B1

(12) United States Patent
Lawson et al.

(10) Patent No.: US 6,481,083 B1
(45) Date of Patent: Nov. 19, 2002

(54) ROBOTIC APPARATUS AND METHOD FOR MOUNTING A VALE STEM ON A WHEEL RIM

(75) Inventors: Lawrence Lawson, Troy, MI (US); Karl D. Sachs, Birmingham, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 0 days.

(21) Appl. No.: 09/344,042

(22) Filed: Jun. 25, 1999

(51) Int. Cl.[7] .............................................. B23Q 17/00
(52) U.S. Cl. ...................... 29/407.04; 29/714; 29/407.1
(58) Field of Search ........................ 29/407.04, 407.05, 29/407.01, 709, 712, 714, 717, 720, 802, 221.5, 894.3, 894.31, 407.1; 157/1

(56) References Cited

U.S. PATENT DOCUMENTS

| | | | |
|---|---|---|---|
| 4,353,156 A | * 10/1982 | Rosaz | 29/221.5 |
| 4,614,077 A | * 9/1986 | Muto et al. | |
| 4,807,343 A | 2/1989 | Wadsworth | 29/221.5 |
| 4,841,632 A | 6/1989 | Namiki et al. | |
| 4,887,341 A | 12/1989 | Sakimori | 29/156.4 R |
| 5,040,290 A | 8/1991 | Usui et al. | 29/787 |
| 5,115,701 A | * 5/1992 | Lenhert | |
| 5,148,591 A | * 9/1992 | Pryor | 25/407.04 X |
| 5,159,745 A | 11/1992 | Kato | 29/407 |
| 5,206,984 A | * 5/1993 | Matsumoto et al. | 29/802 X |
| 5,303,463 A | * 4/1994 | Pollard | |
| 5,537,734 A | * 7/1996 | Belka et al. | |
| 5,685,210 A | 11/1997 | Ringle et al. | |
| 5,940,960 A | 8/1999 | Doan et al. | |
| 6,026,552 A | * 11/2000 | Matumoto | |

FOREIGN PATENT DOCUMENTS

JP 0209904 * 11/1984 .................... 157/1

* cited by examiner

Primary Examiner—David P. Bryant
Assistant Examiner—Steven Blount
(74) Attorney, Agent, or Firm—Young & Basile, P.C.

(57) ABSTRACT

In an automated method for mounting a valve stem to the rim of an automotive vehicle wheel, rims are supplied in series by a conveyor to a gauging station where the location and alignment of a hole for receiving the valve stem is determined by a machine vision system. An electronic control system directs a robotic manipulator to grasp the rim, move it to a mounting station where a valve stem is retained, position the rim such that the hole is in alignment with the valve stem, and urge the rim toward the valve stem to insert the valve stem through the hole in the rim. If necessary, a power-actuated nut runner, mounted on the robotic manipulator or adjacent the mounting station, is used to tighten a nut over the valve stem to secure. As an alternative to the machine vision system, the gauging station may utilize a rotating table which rotates the wheel about its central axis, and an "electric eye" optical sensor which directs a beam of infrared light onto the rim. As the rim rotates through the beam, the presence or lack of a reflection of the light beam is used to detect the location of the hole, and rotation of the table is stopped when the hole is in alignment with the beam. A probe mounted on the gauging station may be extended to project into the hole to confirm that the hole is at the desired position and reposition the rim slightly to provide a precise positioning of the hole.

45 Claims, 4 Drawing Sheets

ROBOTIC APPARATUS AND METHOD FOR MOUNTING A VALE STEM ON A WHEEL RIM

FIELD OF THE INVENTION

The present invention relates to the assembly of wheels for automotive vehicles, and more specifically to a new apparatus and method for mounting a valve stem on a wheel rim.

BACKGROUND OF THE INVENTION

The great majority of wheels produced for automotive vehicles include a metal rim, a tubeless tire mounted on the rim, and a valve stem which projects through a hole in the rim to communicate with the interior of the tire and permit inflation.

In the past, automobile wheels have been assembled utilizing primarily manual labor. In particular, the mounting of the valve stem to the rim has been accomplished by a hand-held stem inserter tool such as that disclosed in U.S. Pat. Nos. 3,852,839 and U.S. Pat. No. 4,807,343. Similarly, the mounting of the tire on the rim has involved a worker placing the rim in a fixture, positioning the tire partially over the rim, and actuating a machine which then presses the tire downwardly into position around the rim. Such manual processes are expenses because of the labor and time involved, and are subject to human error which may produce defective wheels.

It is desirable to adapt modern robotic and machine vision systems to automate the manufacture of mounted tires.

SUMMARY OF THE INVENTION

It is an objective of this invention to provide a method and apparatus for the high volume, low cost assembly of valve stems to wheel rims. It is a further objective of this invention to provide a completely automated method and apparatus utilizing a robotic manipulator to handle the rim during assembly.

It is a further objective of this invention to provide an automated assembly apparatus and method adapted to handle different types and sizes of rims having valve stem mounting holes at different locations and aligned at different angles.

The present invention is intended for use with both normal sized and miniature rims (such as those used for compact spares on some vehicles) having a hole passing therethrough for receiving a tubular valve stem. According to the invention, the rim is positioned in a gauging station where the location and alignment of the hole is determined. A robotic manipulator grasps the wheel in the gauging station and, under the direction of an electronic control system, moves the rim to a mounting station where a valve stem is retained. The manipulator positions the rim such that the hole is in alignment with the longitudinal axis of the valve stem, and the valve stem and the wheel are then moved relative to one another to insert the valve stem through the hole in the rim.

According to a preferred embodiment of the invention, the gauging station utilizes a machine vision system to determine the radial and circumferential location of the hole on the rim and the angle which the central axis of the hole makes with the central axis of the rim. These factors may be determined, at least in part, by programming the machine vision system to recognize certain features of the rim which identify it as being an example of one of a plurality of pre-programmed types of rims. The hole location and/or alignment information for each type of rim is stored, and need not be directly measured by the machine vision system. The data describing the location and alignment of the hole is relayed to the control system so that it can direct the robotic manipulator to properly position the rim in relation to the valve stem at the mounting station.

According to another feature of the invention, the automated assembly apparatus includes a plurality of mounting stations, each containing a different type of valve stem. The machine vision system identifies a rim as being an example of one of the plurality of pre-programmed types and directs the robotic manipulator to move the rim to the correct mounting station and insert the valve stem into the hole in the rim. This allows the assembly apparatus to simultaneously handle different types and/or sizes of rims and mount the appropriate type of valve stem to each rim.

In an alternative embodiment of the invention, the gauging station comprises a rotating table for receiving the wheel and rotating it about its central axis, and an "electric eye" optical sensor which directs a bear of infrared light onto the rim. As the rim rotates through the beam, the presence or lack of a reflection of the light beam is used to detect the location of the hole, and rotation of the table is stopped when the hole is in alignment with the beam. If desired, a probe mounted on the gauging station may be extended to project into the hole to confirm that the hole is at the desired position and, if necessary, reposition the rim slightly to provide a precise positioning of the hole. In this embodiment of the gauging station, the hole is always in the same position relative to the gauging station when the robotic manipulator grasps the rim prior to moving it to the mounting station.

According to another feature of the invention, a power-actuated nut runner is used to tighten a nut over a threaded portion of the valve stem to secure it in connection with the rim. In one possible embodiment of the invention, the nut runner is mounted on the robotic manipulator. In an alternative embodiment, the nut runner is mounted on or adjacent to the valve stem mounting station.

According to another feature of the invention, a sorting and conveying apparatus is disposed on or adjacent the mounting station and supplies a continuous stream of valve stems for mounting to rims which are passed in sequence to the mounting station by the robotic manipulator.

In the preferred embodiment of the invention, the valve stem is held substantially stationary relative to the mounting station and the robotic manipulator urges the wheel onto the valve stem. It has been found that this method of inserting the valve stem through the hole provides for an accurate, positive, and repeatable insertion of the valve stem into the hole.

In yet another feature of the invention, the robotic manipulator transfers the assembled rim and valve stem from the mounting station to a subsequent work station and releases the rim with the valve stem in a consistent, desired reference position relative to the work station. This allows subsequent assembly steps to be performed on the rim, such as mounting of a tire, to be accomplished with reference to the position of the valve stem on the rim.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
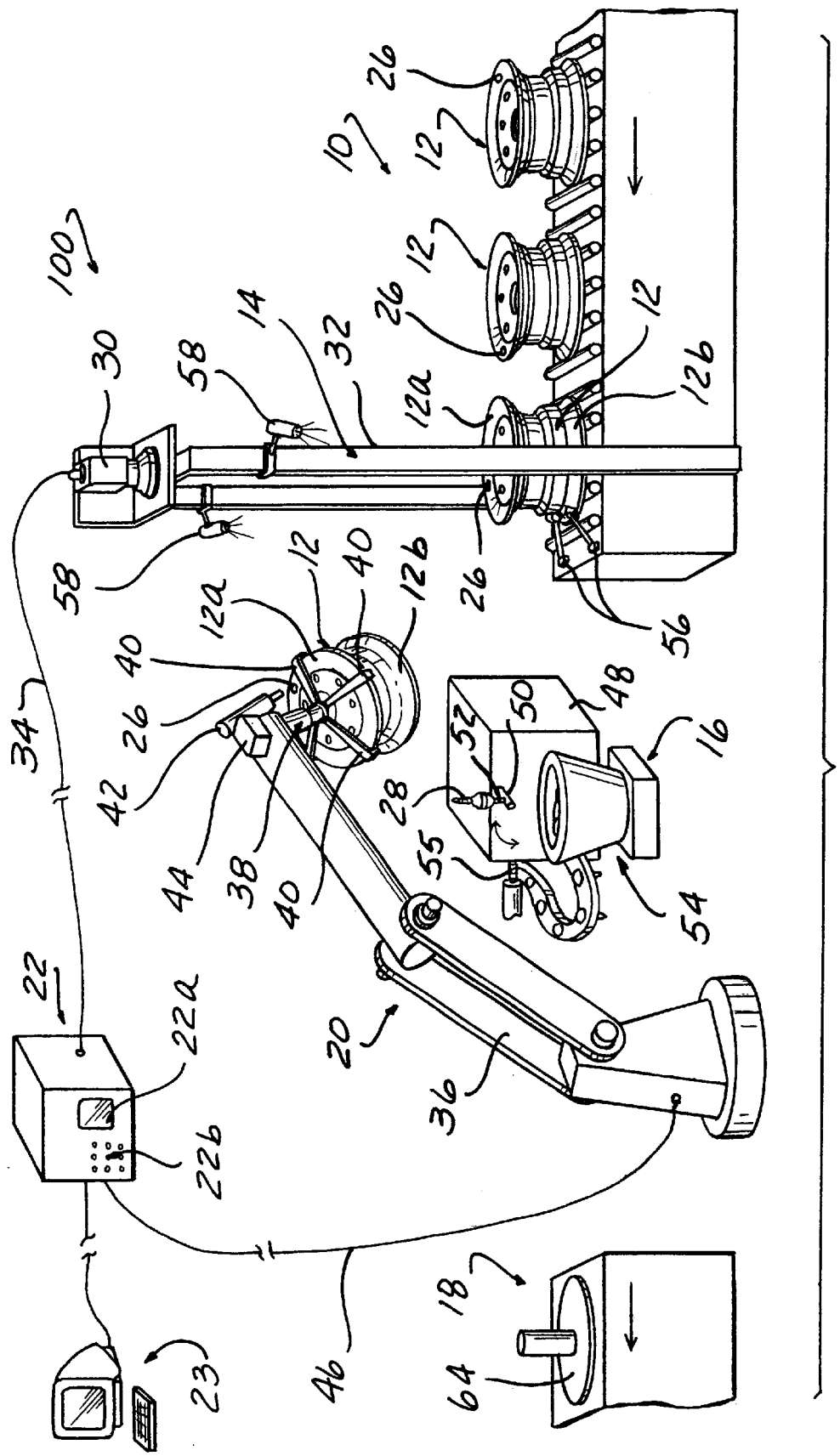
FIG. 1 is a perspective view of the invention apparatus employing a machine vision system as part of a gauging station.

As seen in FIG. 1, an automated assembly line 100 for mounting valve stems to wheel rims comprises an input conveyor 10 on which rims 12 are supplied in a single-file fashion, a gauging station 14 adjacent the end of the input conveyor, a valve stem mounting station 16 located adjacent the gauging station, an output conveyor 18 for carrying the assembled wheel/stem units away, and a robotic manipulator 20 for transferring the rims from the gauging station to the mounting station and then to the output conveyor.

Operation of the automated assembly line 100 is monitored and directed by an electronic control system, indicated schematically at 22. The control system 22 preferably includes input/output means such as a display screen 22a and a keypad 22b for allowing a human operator (not shown) to receive information regarding-the status of the line and program desired modes of operation. The control system unit 22 may be connected to and/or integrated with other information processing systems so that the assembly line 100 can be monitored and controlled from one or more locations remote from the line itself. For example, the control system 22 may be connected with a plant-wide network to allow its operation to be controlled and monitored from a computer station 23 located at some remote location.

The input conveyor 10 is, shown to be of the type comprising a series of parallel rollers, however it may alternatively be any of the various types of conveyors known in the material handling art. The rims 12 are of the type used for automotive vehicle wheels for receiving tubeless tires (not shown), and have opposite first and second flanges 12a,12b. The first flange 12a has a hole 26 formed therethrough for receiving a valve stem 28.

The gauging station 14 is located at the end of the input conveyor 10 and, in the preferred embodiment of the invention, comprises a closed circuit video camera 30 mounted above the conveyor line on a support frame 32. The video camera 30 is of the type used in machine vision systems and is directed downwardly so that it images the upper flange 12a of a rim located in the gauging station. The output of the video camera 30 is communicated to the control system 22 by a cable 34.

The robotic manipulator 20 is preferably of the type commonly used in modern manufacturing operations and comprises an arm 36 capable of compound, multi-axial movement. A gripper 38 at the end of the arm 36 has fingers 40 actuable to alternatively grasp and release the wheel rim 12. A nut runner 42 is mounted on the robotic manipulator 20 adjacent the gripper 38. The nut runner 42 is a pneumatically or electrically powered device for rotating a threaded nut over a matingly threaded male component. A magazine 44 for holding a large number of nuts and feeding them to the nut runner 42 is also mounted on the arm 36. The robotic manipulator 20 is electrically connected with the control system 22 by a cable 46.

The valve stem mounting station 16 comprises a base 48 and a shaft 50 extending generally horizontally therefrom. The shaft 50 is rotatable with respect to the base 48 and is powered by, for example, a electric servomotor (not shown). A stem holding finger 52 projects from the shaft 50 for rotation therewith, and is small enough to fit within the hollow interior of a valve stem 28. A vibratory sorting and conveying mechanism 54 of the type known in the art of automated assembly is mounted on or near the base 48 and supplies a stream of valve stems 28 to an output position 55 adjacent to the finger 52.

Rotation of the shaft 50 moves the finger 52 between a first position in which it points toward the output position 55 of the stem conveying mechanism 54 so that a stem 28 may slide over the finger, and a second position wherein the finger 52 and valve stem 28 carried thereby point generally upward.

During operation of the invention's automated stem mounting apparatus, rims 12 are placed on the input conveyor 10 at an upstream location such that the flange 12a having the valve stem hole 26 formed therethrough is oriented upwardly. As a rim 12 reaches the end of the input conveyor 10, it comes into contact with one or more blocks 56 which stop the rim directly below the video camera 30 in the gauging station 14. When the rim 12 is stationary in the gauging station 14, the control system 22 activates the video camera 30 to image the rim. If ambient lighting in the vicinity of the conveyor is not sufficient to allow the video camera 30 to acquire a high resolution image, additional light fixtures 58 may be provided.

The image produced by the video camera 30 is relayed to the control system 22 where a digital pattern recognition program of the type known in the machine vision art is utilized to determine the location of the valve stem hole 26 relative to the gauging station 14 and the angle $\alpha$ (see FIG. 2) by which the central axis 60 of the hole 26 deviates from the central axis 62 of the rim 12.

It is possible for the pattern recognition software to be configured to determine the location and/or alignment of the hole 26, at least in part, by identifying physical features of the rim 12 other than the hole itself. For example, features such as the spoke pattern and/or the diameter of the rim 12 may be used to identify the rim as being an example of one of several types of rims recognized by the software. The hole location and/or alignment information for these rim types is stored as part of the pattern recognition software. The hole alignment angle $\alpha$ may be particularly difficult to determine through direct measurement by the machine vision system, and so it may be advantageous to have this parameter stored and retrieved once the type of rim is identified.

Identification of the type and/or manufacturer of each rim processed by the invention assembly line 100 may also be used in other phases of the tire assembly process. This knowledge may be used, for example, to ensure that the correct tire for each rim is supplied to an automated tire mounting assembly line which follows the stem mounting line in a plant.

Next, the control system 22 actuates the robotic manipulator 20 to grasp the rim 12, lift it from the gauging station 14, and move it to the mounting station 16. The location and alignment of the hole 26, as determined by the machine vision system, is utilized by the control system 22 to direct the robotic manipulator 20 to rotate the rim 12 as necessary to position the hole 26 in alignment with the valve stem 28 on by the stem holding finger 52 and with the nut runner 42 (see FIG. 2).

When the hole 26 is aligned with the valve stem 28, the robotic manipulator 20 urges the rim 12 toward the valve stem 28 so that the valve stem is inserted through the hole 26. It is also possible for the mounting station 16 to include means for moving the valve stem 28 toward the rim 12 and into the hole 26, rather than holding the stem stationary as the rim is urged downwardly.

Figure 2:
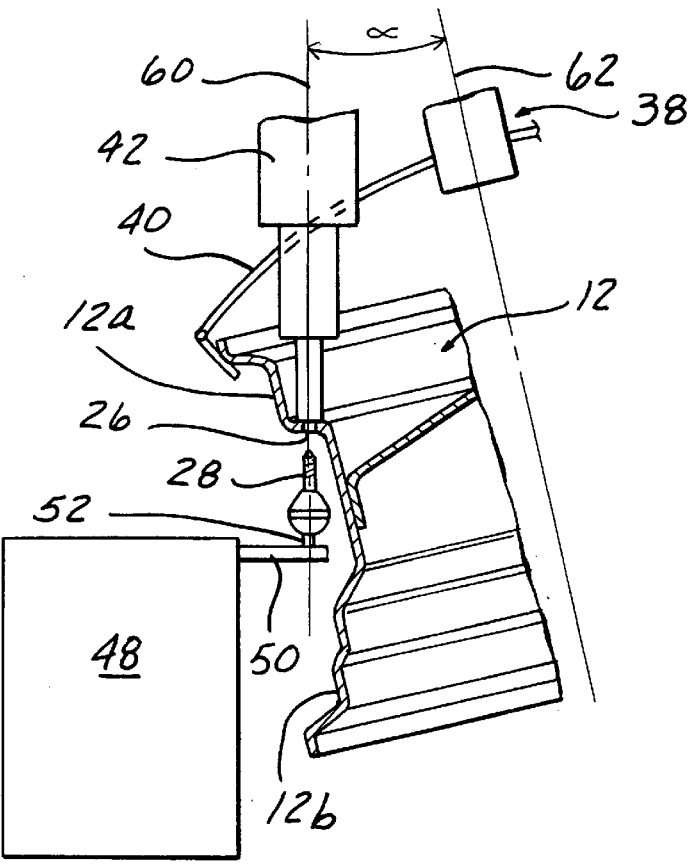
FIG. 2 is a partial side view of the mounting station with a rim positioned in preparation for being urged downwardly over a valve stem.

As seen in FIG. 2, insertion of the valve stem 28 through the hole 26 also results in the stem sliding into the end of the nut runner 42. The nut runner 42 is then activated to place a nut over the end of the valve stem 28 and rotate and tighten the nut, thereby securing the valve stem in connection with the rim 12.

Generally speaking, only certain specialty valve stems (for example, those having an integral pressure transducers for on-vehicle monitoring of the tire pressure) must be secured to the rim 12 with a nut. The more commonly used types are secured to the rim 12 merely by urging them through the hole 26. Accordingly, the nut runner 42 may be dispensed with on a valve mounting apparatus that is to be utilized only with valve stems which do not require a nut. Alternatively, the nut runner may be retained and the control system programmed to perform or omit the nut tightening step depending upon the type of valve stem and rim being assembled at any particular time.

After the valve stem 28 is secured to the rim 12, the robotic manipulator 20 is actuated by the control system 22 to lift the rim 12 away from the mounting station 16, move it to a station for subsequent processing, and place it thereon. In the embodiment of the invention shown in FIG. 1, the subsequent processing station is an output conveyor 18 comprising a series of platforms 64 each of which is adapted to receive a rim 12.

Figure 6:
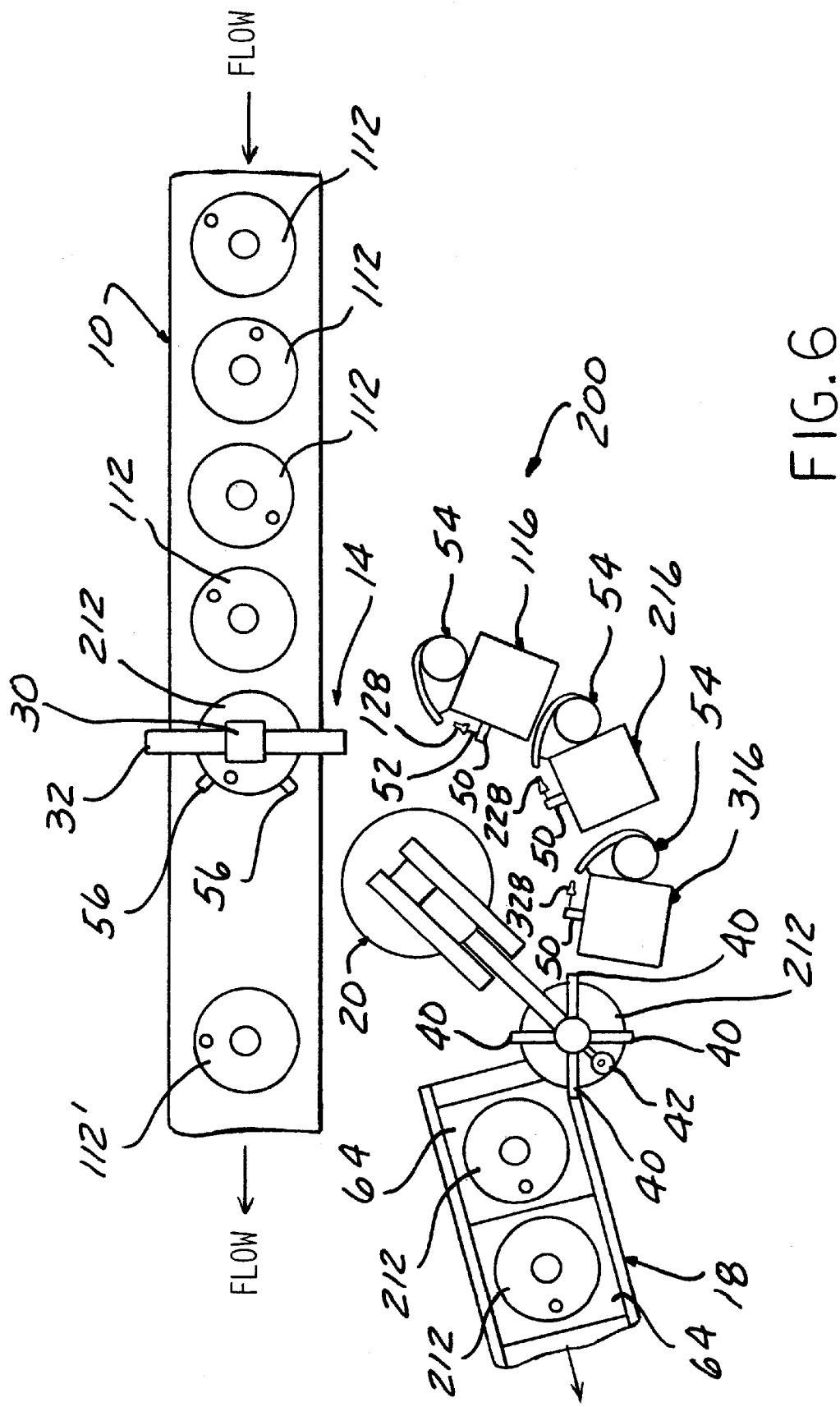
FIG. 6 is a plan view of an alternative embodiment of an assembly line having multiple mounting stations.

FIG. 6 shows an assembly line 200 having three separate stem mounting stations 116,216,316 each of which is loaded with a different type of valve stem, 128,228,328 respectively. The different valve stems may be intended for use with different types of rims which are handled by the assembly line 200, and/or the stems may be different types which are alternatively mounted to a single type of rim. For example, the assembly line 200 is shown configured to process two different types and/or sizes of rims: a first type of rim 112 for passenger cars and a second type of rim 212 for light trucks. In this example, the passenger car rims 112 may be fitted with either a standard valve stem 128 or a special valve stem 228 having an integral pressure transducer, while all light truck rims 212 are to be fitted with a heavy duty valve stem 328.

As each rim reaches the gauging station 14, the video camera 30 images the rim and the control system 22 identifies it as either a car rim 112 or a truck rim 212, based upon programmed physical features as described hereinabove. The control system 22 then directs the robotic manipulator 20 to move the rim to whichever of the mounting stations 116,216,316 is loaded with the correct stem for that rim. The nut runner 42 mounted to the robotic manipulator 20 is activated to thread a nut over the end of the valve stem only when a stem requiring such action, such as pressure transducer stem 228, has been mounted to the rim.

For the passenger car rims 112, the selection between the standard stem 128 and the pressure transducer stem 228 depends upon planned production schedule information which has been previously programmed into the control system 22 by a human operator using the key pad 22b or remote computer 23. The operator may select, monitor, and change all phases of operation of the assembly line using the display screen 22a and key pad 22b or the remote computer 23. Cumulative production data is stored by the control system 22 and may be reviewed by the operator at any time.

The assembly line 200 of FIG. 6 also differs from that of FIG. 1 in that the gauging station 14 is not located at the end of the input conveyor 10, but rather at a midpoint of the conveyor. Any rim that does not meet certain production or quality control criteria programmed into the control system 22 is placed back on the input conveyor 10, which carries the "reject" rim away. For example, in FIG. 6 a car rim 112' has been replaced on conveyor 10 after imaging because it arrived at the gauging station 14 out of sequence. The control system 22 was programmed to process rims only in groups of four identical rims advancing in series down the assembly line, and since the car rim 112' followed two light truck rims 212 instead of meeting this criterion, it was removed from the production sequence. Other reasons for taking a rim out of the production sequence may include the rim being positioned on the input conveyor with the hole 26 oriented downwardly, or some incorrect rim geometry which makes the rim unrecognizable to the control system. Production irregularities such as these may generate a message for display on the video screen 22a and/or the remote computer 23 to alert the operator to a problem requiring immediate attention.

FIG. 6 also depicts a preferred mode of operation wherein the robotic manipulator 20 deposits each rim 112,212 onto its conveyor platform 64 with the mounted valve stem at a consistent and known reference angular position relative to the platform, in this case at twelve o'clock with respect to the direction of movement of conveyor 18. Having the mounted valve stem in a reference position may be desirable for accomplishing subsequent assembly steps. For example, when mounting a tire (not shown) to a rim it is generally preferable to align the heaviest point on the circumference of the rim with the lightest point on the circumference of the tire in order to achieve as close to a perfectly balanced wheel/tire combination as possible. If it is known that the valve stem is the heaviest point on the rim, placement of the rim on the output conveyor with the stem at a reference position will eliminate the necessity of locating the valve stem again prior to mounting a tire to the rim.

One advantage of the invention apparatus and method is that the robotic manipulator 20 is able to execute a complex, non-linear motion to insert the valve stem through the rim if this is necessary due to the geometry of the rim or some other consideration. Some rims, such as those used as compact spares to save space and weight in passenger vehicles, have flanges that are too close together to allow the axes of the valve stem and of the hole to be aligned with one another and the stem inserted into the hole by moving the rim and the stem in a straight line relative to one another.

Figures 3A, 3B:
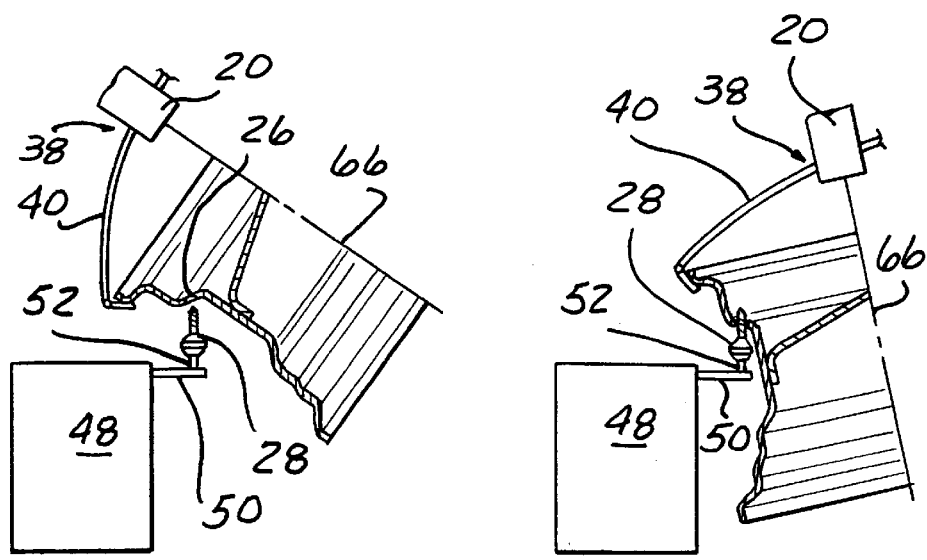
FIG. 3A is a partial side view of the mounting station with a miniature rim just prior assembly with the valve stem.
FIG. 3B is a partial side view of the miniature rim of FIG. 3A after assembly with the valve stem.

A possible mode of operation is depicted in FIGS. 3A and 3B, which show a valve stem 28 being mounted to an undersized rim 66. The control system 22 is programmed to recognize an undersized rim 66 and direct the robotic manipulator 20 to position the rim 66 such that the tip of the valve stem 28 is adjacent hole 26, but with the hole's central axis at an angle to the stem's longitudinal axis (see FIG. 3A). The robotic manipulator 20 then rotates the rim 66 clockwise about an axis extending out of the plane of FIG. 3, while simultaneously moving the rim vertically downward to slide the valve stem 28 into the hole 26 (see FIG. 3B).

Figure 4:
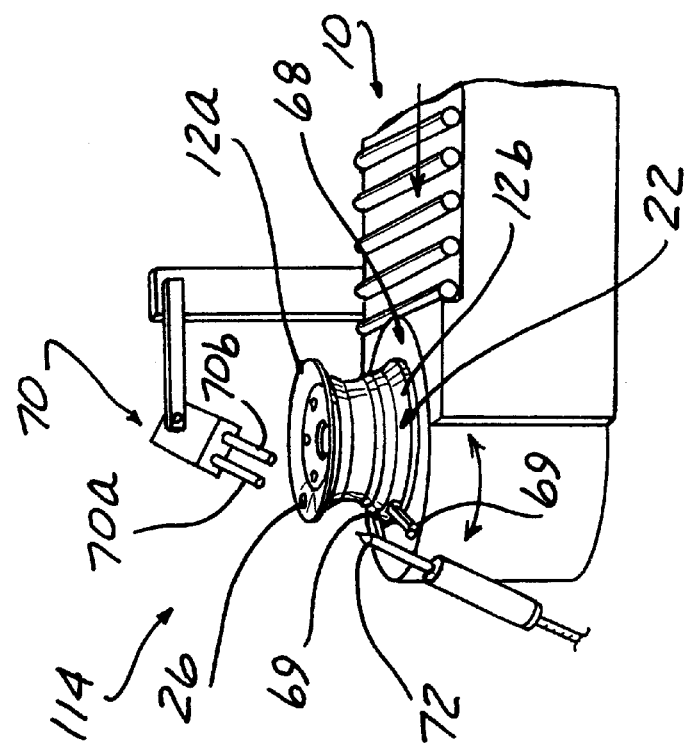
FIG. 4 is a perspective view of an alternative embodiment of a gauging station employing an electric eye.

FIG. 4 depicts an alternative embodiment of a gauging station 114 for use in conjunction with the present invention. The gauging station 114 comprises a motor-driven rotating table 68 located at the end of the input conveyor 10 and an "electric eye" optical sensor 70 disposed above the table 68. The optical sensor 70 preferably utilizes a beam of infrared light, as is known in the art.

The sensor 70 comprises a transmitter 70a mounted above the rotating table 68 and aimed to direct its beam onto a rim 12 located on the table, the beam striking the flange 12a at a point which is the same radial distance from the central axis of the rim as the hole 26. A receiver 70b is located adjacent the transmitter 70a so that the beam will strike the receiver 70b when it reflects off of the flange. Alternatively, the receiver 70b may be mounted below the upper flange 12a of the rim and aligned with the transmitter 70a to receive the beam when the beam passes through the hole 26.

As a rim 12 reaches the end of the input conveyor 10, it slides onto the rotating table 68 and is stopped at that point by one or more stop blocks 69 which precisely position the rim 12 so that its central axis is in coaxial alignment with the axis of rotation of the rotating table 68. The optical sensor 70 is activated, and the rotating table 68 begins to turn so that the beam sweeps around the circumference of the flange 12a at the proper radial distance from the center of the rim to pass through the hole 26 when the hole 26 comes into alignment with the beam.

As long as the beam strikes the flange 12a, it is reflected back to the receiver 70b. When the hole 26 comes into alignment with the beam, it is no longer reflected back to the receiver 70b and this change in the condition of the optical sensor 70 causes the rotating table 68 to stop so that the hole 26 remains in alignment with the beam. The robotic manipulator 20 then grasps the rim 12 and moves it from the gauging station 114 to the mounting station 16. The hole 26 is always in the same location relative to the gauging station 114 and the robotic manipulator 20, so the control system 22 directs the manipulator to execute the same motion each time it moves a rim 12 to the mounting station 16 and positions it for insertion of the valve stem 28.

It may be desirable to provide a mechanical means for precisely positioning the rim 12 relative to the gauging station 114 before the rim is grasped by the robotic manipulator 20. This may be achieved by a probe 72 counted adjacent a rotating table 68 and which is extended upwardly to enter the hole 26 after the rotating table 68 has stopped turning. The probe 72 has a tapered tip so that it will enter the hole 26 even if the hole 26 is slightly misaligned with the probe 72, and as the probe 72 extends fully into the hole 26 it will reposition the rim 12 somewhat to correct any misalignment.

Figure 5:
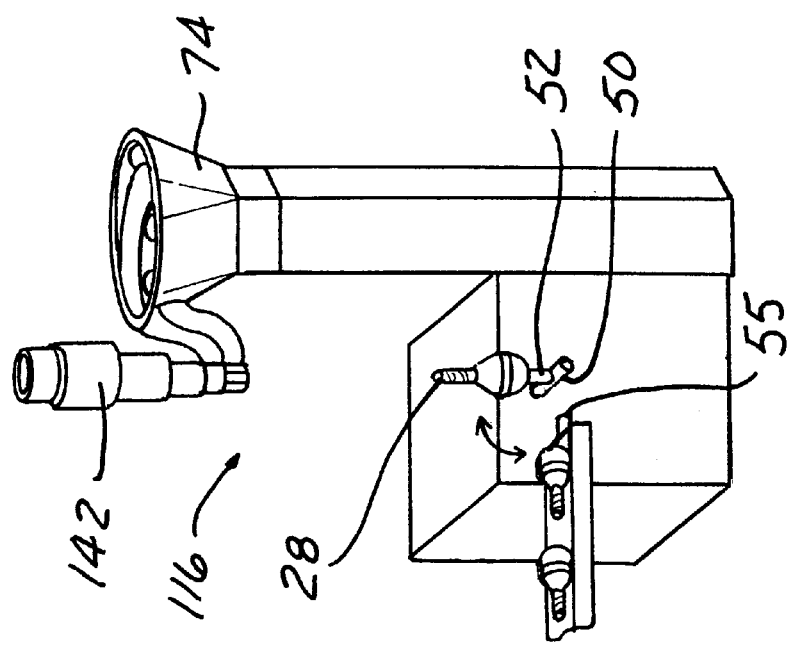
FIG. 5 is a perspective view of an alternative embodiment of a mounting station having a nut runner.

FIG. 5 depicts an alternative embodiment of a mounting station 116 for use with the present invention wherein a nut runner 142 is mounted on or adjacent the mounting station 116 rather than being disposed on the robotic manipulator. FIG. 5 shows the nut runner 142 in a raised position wherein there is sufficient clearance between the valve stem holding finger 52 and the lower end of the nut runner 142 for the rim 12 to be placed over a valve stem 28 positioned on the finger. After the rim 12 has been placed over the valve stem 28, the nut runner 142 moves or telescopes downwardly (not shown) over the valve stem to place a nut over the stem and tighten the nut. A vibratory sorting and conveying apparatus 74 of the type known in the art feeds nuts to the nut runner 142.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for assembling a valve stem to a wheel rim having an aperture formed therein comprising the steps of:
   determining a location of the aperture relative to a gauging station;
   coaxially aligning a central axis of the aperture and a longitudinal axis of the valve stem with respect to one another prior to insertion of the valve stem through the aperture; and
   moving the rim relative to the valve stem along a programmable path of travel during the coaxially aligning step and along the aligned axes to insert the valve stem through the aperture, the path of travel defined with a programmable robotic manipulator having an arm capable of compound, multi-axial movement and having a plurality of programmed paths corresponding to a plurality of different size wheel rim and valve stem combinations to be assembled.

2. The method of claim 1 wherein the determining step further comprises the step of:
   identifying at least one physical feature of the rim with a machine vision system.

3. The method of claim 1 wherein the aligning step further comprises the step of:
   selectively moving the rim from the gauging station to one of a plurality of valve stem mounting stations in response to the determining step, each mounting station having a differently configured valve stem mounted thereon.

4. The method of claim 1 wherein the determining step further comprises the step of:
   identifying the rim as of a plurality of different types of rims in response to inspection with a machine vision system.

5. The method of claim 1 wherein the determining step further comprises the steps of:
   positioning the rim on a rotatable table;
   directing an optical sensor at the rim;
   rotating the table and the rim; and
   stopping rotation of the table and rim when the optical sensor is directed at the aperture.

6. The method of claim 5 further comprising the step of:
   inserting a mechanical probe into the aperture to verify the location of the aperture before insertion of the valve stem through the aperture.

7. The method of claim 6 wherein the inserting step further comprises the step of:
   moving the rim with the probe to align the aperture with respect to the probe.

8. The method of claim 1 further comprising the step of:
   tightening a nut over a threaded portion of the valve stem extending from the rim after the valve stem has been inserted with respect to the aperture.

9. The method of claim 8 wherein the nut is tightened to the valve stem by a nut runner mounted on the robotic manipulator.

10. The method of claim 8 wherein the nut is tightened to the valve stem by a nut runner mounted adjacent to the mounting station.

11. The method of claim 1 further comprising the step of:
conveying valve stems to the mounting station in a serial fashion with conveying means.

12. The method of claim 1 wherein the moving step further comprises the steps of:
holding the valve stem substantially stationary; and
urging the rim toward the valve stem with the robotic manipulator.

13. The method of claim 1 further comprising the step of:
moving the rim and attached valve stem from a mounting station to a subsequent processing station such that the rim is oriented with the valve stem in a predetermined angular position relative to the subsequent processing station.

14. An apparatus for assembling a valve stem to a wheel rim having an aperture formed therein comprising:
means for determining a location of the aperture relative to a gauging station;
means for coaxially aligning the central axis of the aperture and a longitudinal axis of the valve stem with respect to one another prior to insertion of the valve stem through the aperture; and
means for moving the rim relative to the valve stem along a programmable path of travel including alignment of the central axis of the aperture with the longitudinal axis of the valve stem and along the aligned axes to insert the valve stem through the aperture, the path of travel defined with a programmable robotic manipulator having arm capable of compound, multi-axial movement and having a plurality of programmed paths corresponding to a plurality of different size wheel rim and valve stem combinations to be assembled.

15. The apparatus of claim 14 wherein the means for determining further comprises:
a machine vision system to identify at least one physical feature of the rim.

16. The apparatus of claim 15 wherein the aligning means further comprises:
the robotic manipulator to selectively move the rim to one of a plurality of mounting stations having different valve stems mounted thereon in response to the identification by the machine vision system.

17. The apparatus of claim 14 wherein the means for determining further comprises:
a machine vision system to identify the rim as being one of a plurality of different rims.

18. The apparatus of claim 14 wherein the means for determining further comprises:
a rotatable table for selectively rotating the rim; and
an optical sensor to detect the location of the aperture as the rim is rotated.

19. The apparatus of claim 18 further comprising:
a probe extendable through the aperture after the rim has been rotated to verify the location of the aperture prior to insertion of the valve stem through the aperture.

20. The apparatus of claim 19 wherein the probe is operable to reposition the rim to bring the aperture into alignment with the probe.

21. The apparatus of claim 14 further comprising:
means for tightening a nut over a threaded portion of the valve stem extending from the rim to secure the valve stem to the rim.

22. The apparatus of claim 21 wherein the means for tightening further comprises:
a nut runner mounted on the robotic manipulator.

23. The apparatus of claim 21 wherein the means for tightening further comprises:
a nut runner mounted adjacent to a mounting station where the rim and valve stem are moved relative to each other to insert the valve stem with respect to the aperture.

24. The apparatus of claim 14 further comprising:
means for supplying valve stems in a serial fashion to a mounting station where the rim and valve stem are moved relative to each other to insert the valve stem with respect to the aperture.

25. The apparatus of claim 14 further comprising:
the robotic manipulator for moving the rim and attached valve stem from a mounting station where the valve stem is mounted with respect to the aperture to a processing station while maintaining the valve stem in a predetermined angular position relative to the processing station.

26. The apparatus of claim 14 further comprising:
means for grasping the rim with the robotic manipulator computer-controlled and having a rim-gripper-attachment articulatable and positionable to be in a predetermined orientation with respect to the aperture in the rim.

27. The apparatus of claim 26 further comprising:
means for orienting the aperture of the wheel rim in a predetermined location as a result of articulation and positioning movement of the rim with the robotic manipulator.

28. The method of claim 26 further comprising:
means for orienting the aperture of the wheel rim in a predetermined location as a result of movement of the rim at the gauging station prior to the rim being grasped by the robotic manipulator.

29. A method for assembling a valve stem to a wheel rim having an aperture formed therein comprising the steps of:
determining the location of the valve stem aperture in the rim; and
operably engaging the rim with a robotic manipulator such that the rim moves relative to the valve stem along a programmable path of travel and the valve stem and the aperture are coaxially aligned to insert at least a portion of the valve stem through the aperture in the rim, the path of travel defined with a programmable robotic manipulator having an arm capable of compound, multi-axial movement and having a plurality of programmed paths corresponding to a plurality of different size wheel rim and valve stem combinations to be assembled.

30. The method according to claim 29 wherein the step of determining the location of the aperture further comprises the step of inserting a mechanical probe into the aperture prior to insertion of the valve stem through the aperture to verify the location of the aperture.

31. The method according to 29 further comprising the steps of operably engaging the valve stem and moving the valve stem towards the rim.

32. The method according to claim 29 further comprising the steps of operably engaging the rim and moving the rim towards the valve stem.

33. The method according to claim 29 further comprising the step of securing the valve stem to the rim by tightening a nut over a threaded portion of the valve stem extending from the rim.

34. The method of claim 29 further comprising the step of:
grasping the rim with the robotic manipulator computer-controlled and having a rim-gripper-attachment articulatable and positionable to be in a predetermined orientation with respect to the aperture in the rim.

35. The method of claim 34 further comprising the step of:

orienting the aperture in the rim to a predetermined location during movement of the rim with the robotic manipulator as a result of articulation and positioning of the rim-gripper-attachment.

36. The method of claim 34 further comprising the step of:

orienting the aperture in the rim to a predetermined location at a station prior to the grasping step.

37. An apparatus for assembling a valve stem to a wheel rim having an aperture formed therein comprising:

means for determining the location of the valve stem aperture in the rim; and means for operably engaging the rim such that the rim moves relative to the valve stem along a programmable path of travel and the valve stem and the aperture are coaxially aligned to insert at least a portion of the valve stem through the aperture in the rim, the path of travel defined with a programmable robotic manipulator having an arm capable of compound, multi-axial movement and having a plurality of programmed paths corresponding to a plurality of different size wheel rim and valve stem combinations to be assembled.

38. The method of claim 1 further comprising the step of:

grasping the rim with the robotic manipulator and moving along the path of travel in response to computer-controlled signals.

39. The method of claim 38 further comprising the step of:

actuating the robotic manipulator to move the rim to a valve stem mounting station having the valve stem disposed thereon.

40. The method of claim 1 further comprising the step of:

grasping the rim with the robotic manipulator computer-controlled and having a rim-gripper-attachment articulatable and positionable to be in a predetermined orientation with respect to the aperture in the rim.

41. The method of claim 40 further comprising the step of:

orienting the aperture of the wheel rim in a predetermined location with respect to the rim-gripper-attachment as a result of articulation and positioning of the rim-gripper-attachment by the robotic manipulator prior to the grasping step.

42. The method of claim 40 further comprising the step of:

orienting the aperture of the wheel rim in a predetermined location with respect to gauging station as a result of rotational movement of the rim until the aperture is properly located with respect to the gauging station prior to the grasping step; and the grasping step is performed with the rim-gripper-attachment in a predetermined position with respect to the gauging station as a result of articulation and positioning of the rim-gripper-attachment by the robotic manipulator prior to the grasping step.

43. The apparatus of claim 37 further comprising:

means for grasping the rim with the robotic manipulator computer-controlled and having a rim-gripper-attachment articulatable and positionable to be in a predetermined orientation with respect to the aperture in the rim.

44. The apparatus of claim 43 further comprising:

means for orienting the aperture of the wheel rim in a predetermined location with respect to the rim-gripper-attachment as a result of articulation and positioning of the rim-gripper-attachment by the robotic manipulator prior to grasping the rim.

45. The apparatus of claim 43 further comprising:

means for orienting the aperture of the wheel rim in a predetermined location with respect to gauging station as a result of rotational movement of the rim until the aperture is located with respect to the gauging station prior to grasping the rim; and the means for grasping performed with the rim-gripper-attachment in a predetermined position with respect to the gauging station as a result of articulation and positioning of the rim-gripper-attachment by the robotic manipulator prior to grasping the rim.

* * * * *

UNITED STATES PATENT AND TRADEMARK OFFICE
CERTIFICATE OF CORRECTION

PATENT NO.   : 6,481,083 B1
DATED        : November 19, 2002
INVENTOR(S)  : Lawrence Lawson and Karl D. Sachs It is certified that error appears in the above-identified patent and that said Letters Patent is hereby corrected as shown below:

<u>Title page, Item [54] and Column 1, lines 1-3,</u>
Please delete the title and insert the following:

-- ROBOTIC APPARATUS AND METHOD FOR MOUNTING A VALVE STEM ON A WHEEL RIM --

Signed and Sealed this

Twenty-seventh Day of May, 2003

JAMES E. ROGAN
*Director of the United States Patent and Trademark Office*